United States Patent [19]

Bras

[11] Patent Number: 4,598,204
[45] Date of Patent: Jul. 1, 1986

[54] DETECTOR FOR LOCALIZING AN ELECTROMAGNETIC RADIATION AND A DEVICE FOR PROCESSING SIGNALS SUPPLIED BY SAID DETECTOR

[76] Inventor: Serge M. Bras, 19, rue du Picure, 91330 Yerres, France

[21] Appl. No.: 715,948

[22] Filed: Mar. 25, 1985

Related U.S. Application Data

[63] Continuation of Ser. No. 456,110, Jan. 6, 1983, abandoned.

[30] Foreign Application Priority Data

Jan. 25, 1982 [FR] France ................................ 82 01092

[51] Int. Cl.⁴ ............................................. G01T 1/185
[52] U.S. Cl. ..................................... 250/374; 250/385
[58] Field of Search ................ 250/374, 385, 388, 375, 250/390; 313/93

[56] References Cited

U.S. PATENT DOCUMENTS

| 3,517,194 | 6/1970 | Borkowski et al. | 250/385 |
| 3,911,279 | 10/1975 | Gilland et al. | 250/385 |
| 4,149,109 | 4/1979 | Kreutz et al. | 250/382 |

FOREIGN PATENT DOCUMENTS

| 1512781 | 1/1968 | France . | |
| 2255702 | 7/1975 | France . | |
| 1179406 | 1/1970 | United Kingdom | 250/374 |

OTHER PUBLICATIONS

Stumpel et al., "A Position Sensitive Proportional Counter with High Spatial Resolution", J. Phys. E. (GB), 6, Apr. 1, 1973, pp. 397–400.
Lee et al., "Proportional Chambers with Monofilar Helical Cathodes for High Spatial Resolution", Nucl. Instrum. & Methods, 109 (3), Jun. 15, 1973, pp. 421–428.
Nuclear Instruments and Methods, North Holland Publishing Co., Aug. 15, 1975, vol. 127, No. 3, pp. 329–337.

Primary Examiner—Carolyn E. Fields
Attorney, Agent, or Firm—Lackenbach Siegel Marzullo Presta & Aronson

[57] ABSTRACT

A detector is provided comprising two insulating supports (44,46) in the form of half cylinders, provided on their cylindrical wall with a small pitch thread, said supports being fixed by their ends to a mounting frame (40) which holds them spaced apart and parallel, with their cylindrical wall turned outwardly, a cathode wire (60) being wound around the threaded portion of said supports and an anode wire being stretched inside the coil, between two terminals carried by the frame.

13 Claims, 34 Drawing Figures

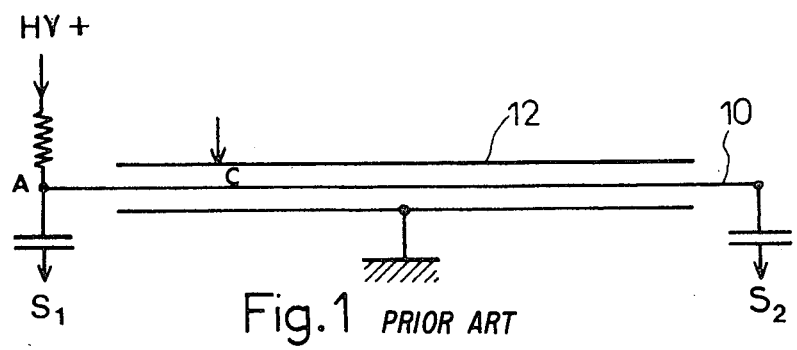
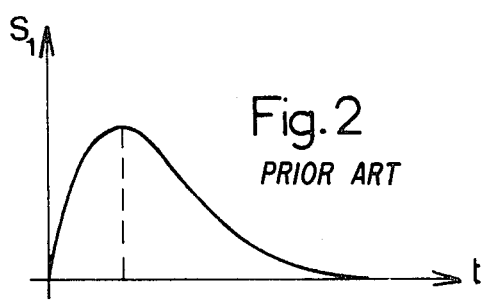
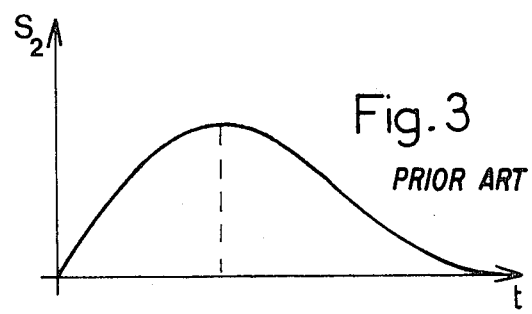
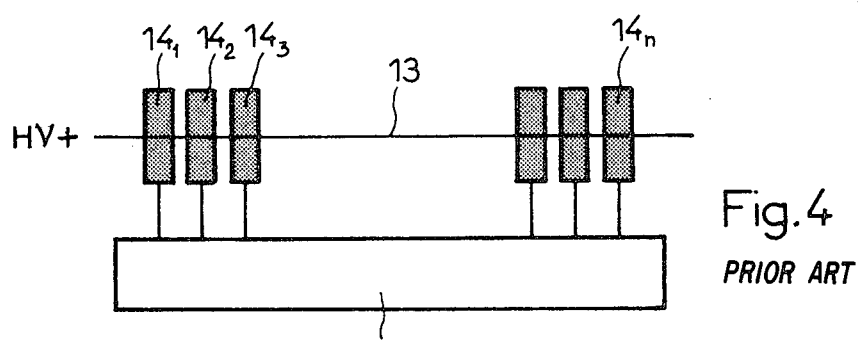
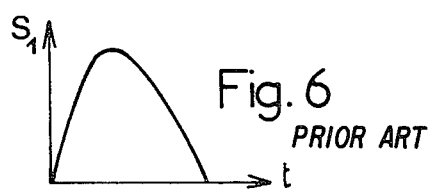
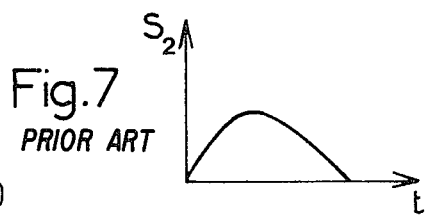
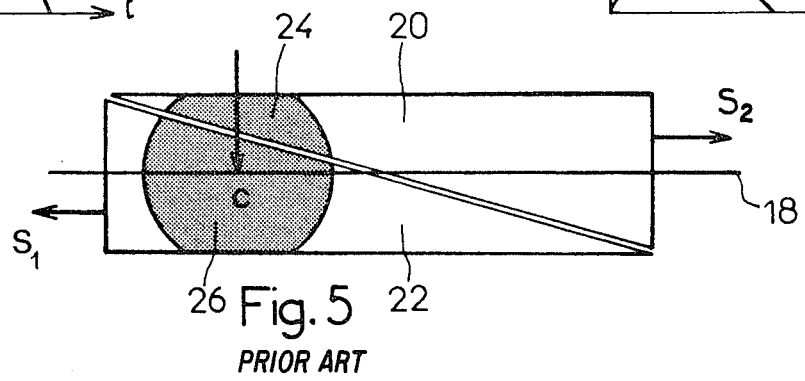

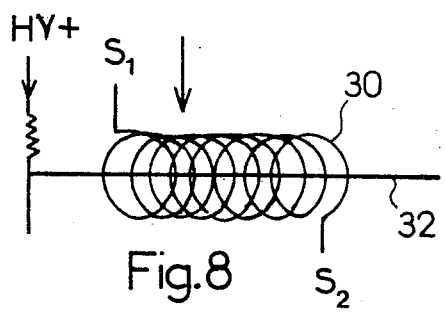
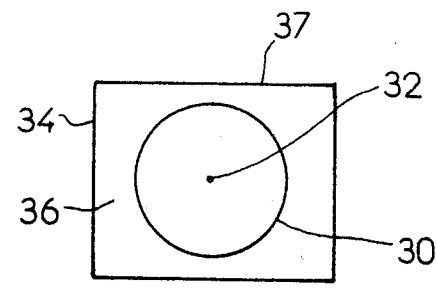
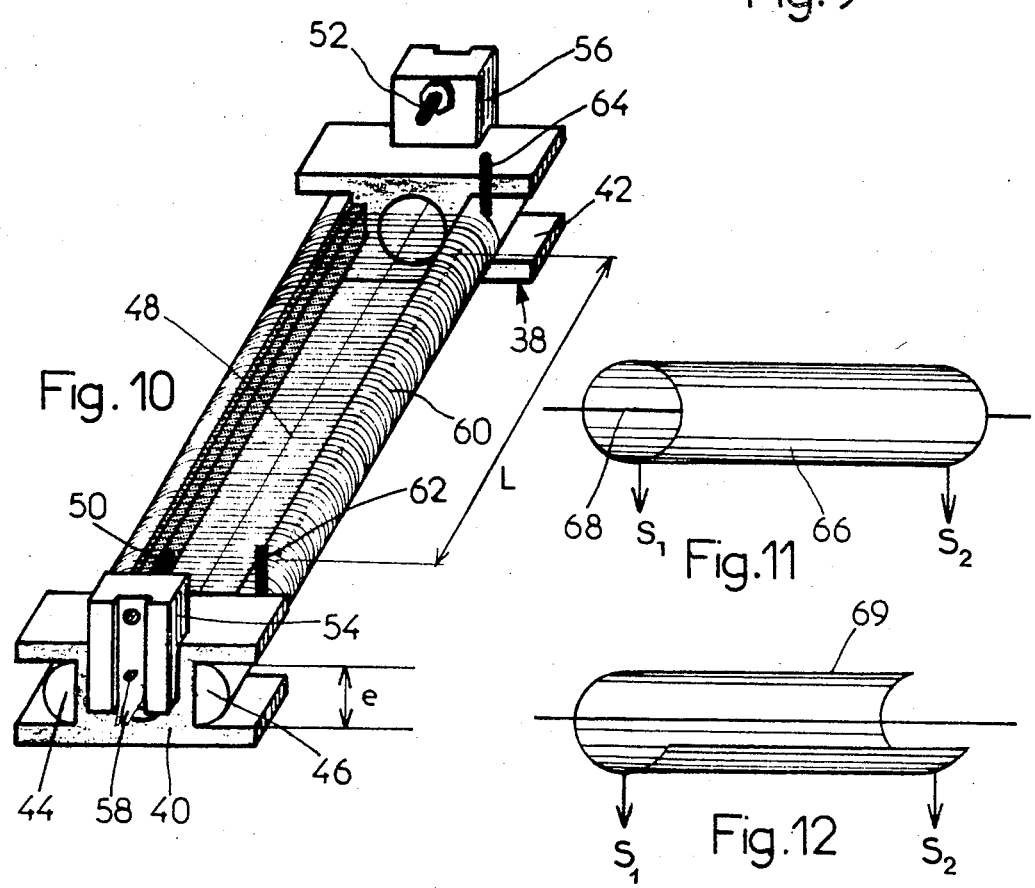
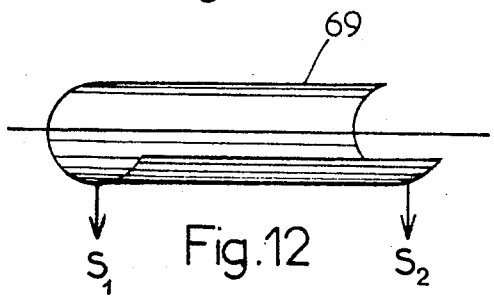
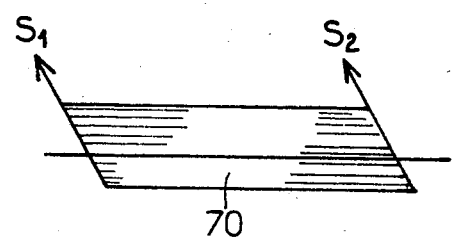

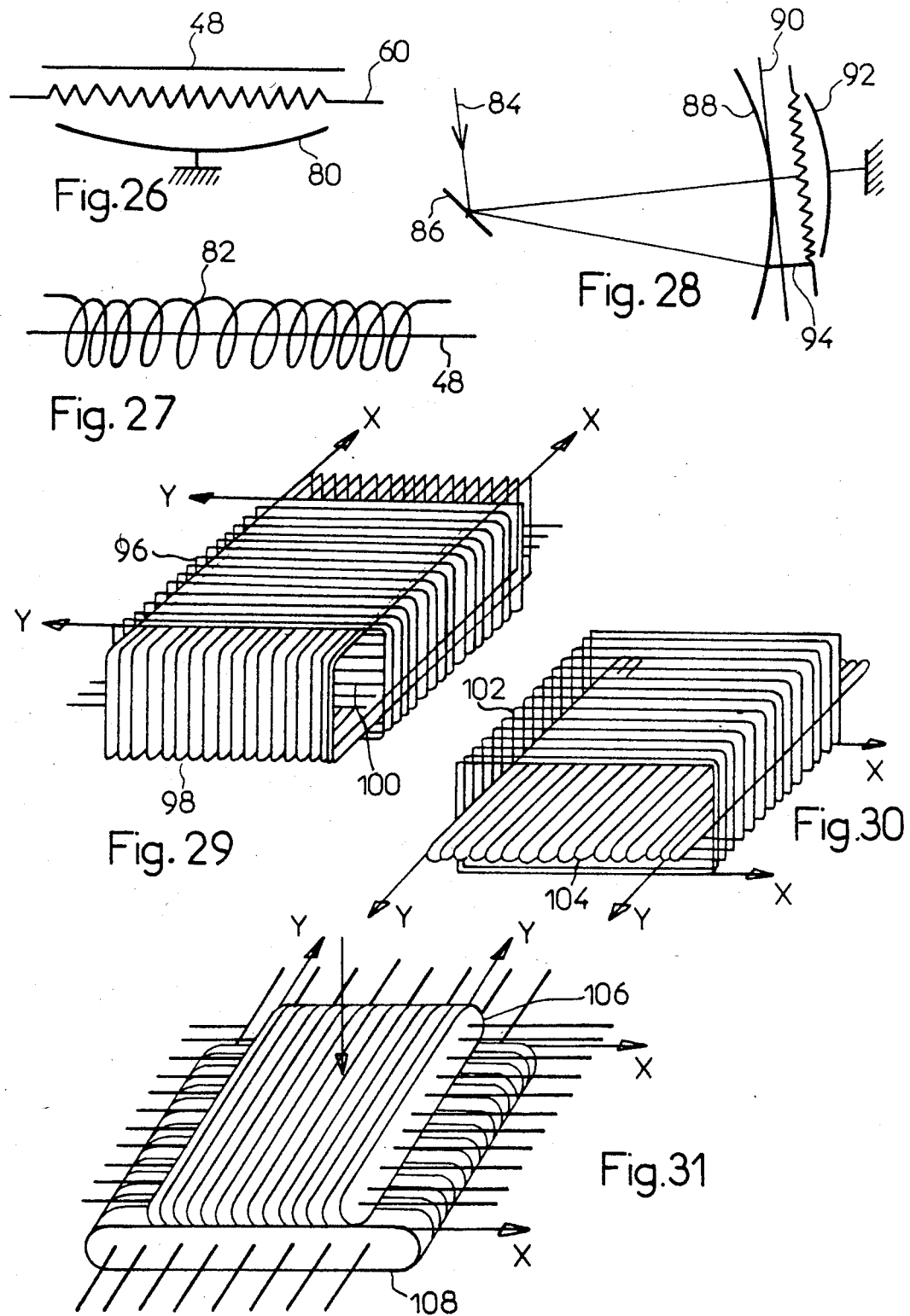

DETECTOR FOR LOCALIZING AN ELECTROMAGNETIC RADIATION AND A DEVICE FOR PROCESSING SIGNALS SUPPLIED BY SAID DETECTOR

This is a continuation of application Ser. No. 456,110, filed Jan. 6, 1983, now abandoned.

The present invention relates to a detector for localizing the impact point of an electromagnetic radiation.

The diffraction of X-rays, used in the analysis of atomic structures in crystallography, metallurgy and bioilogical chemistry, uses the distribution in space of the secondary radiation coming from the sample.

It is then a question of measuring the intensity of a radiation at a point dependent on its position.

The method usually employed used a pin-point detector and the number of X photons are recorded which it detects during its movement.

It is also possible to make use of a detector sensitive over a certain surface and to record the number of photons received simultaneously at different points on this surface: this is what the photographic plate provides but its efficiency is mediocre.

Gas proportional counters are also known which allow each photon to be counted individually and its position localized. The best localization counters at the present time are unidimensional and are sensitive over a narrow rectilinear strip of a length of about 50 mm. Such a counter was constructed for the first time by BORKOWSKI and KOPP (Rev. Sci. Instrum. n° 39, page 1515, 1968). As FIG. 1 shows schematically, this counter comprises a resistant quartz wire 10 connected to the positive terminal of a high voltage source. This wire, which serves as anode, is coated with a layer of carbon.

Thus a distributed constant resistance-capacity line 12 is formed. Localization of the impact point of the photon on this line is obtained by measuring the rise times of signals $S_1$ and $S_2$ which result therefrom and which are collected at the ends A and B of wire 10. Thus, in the case where the impact is at a point C closer to end A than to end B, signals $S_1$ and $S_2$ will have the trend shown in FIGS. 2 and 3: the rise time of signal $S_1$ is very short and that of signal $S_2$ is longer. By shaping the signals by double differentiation data is obtained about the position of the detected radiation, as will be explained in detail hereafter.

This counter, which has the advantage of great simplicity, is on the other hand very fragile for the carbon layer may be easily destroyed if it is exposed to an intense beam of X radiation. This counter is then at the mercy of wrong handling.

Other counters have been invented since and they all tend to use a metal anode wire, so very robust and, instead of using directly the signal received at the anode, they use the electrostatic influence created on a cathode by the charge developed by avalanche in the vicinity of the anode. In this type of counter, there may be mentioned the delay line detector of GABRIEL illustrated schematically in FIG. 4. This counter is formed by a central anode metal wire 13, for example made from gold coated tungsten brought to a high potential. The cathode situated on each side of wire 13 is at a zero potential. It is formed by a Plexiglass cell whose bottom is divided into parallel electrically conducting strips $14_1$, $14_2$ . . . $14_n$. Each of said strips is connected to a distributed constant line 16 also fragmented. An argon and methane gas current flows through the cell. This detector has as advantages, good robustness because of its metal anode wire, rapidity in counting resulting from the low time constant of line 16 and good linearity. However, the response curve is strewn with irregularities due to parasite reflections each time connection is made on a cathode. This drawback makes the detector difficult in use and this is why it has not been industrialized.

Finally, the clearance detector of JACQUET is known. This detector still comprises an anode wire 18, but its cathode is formed by two pieces 20, 22 in the form of right-angled triangles, disposed in contact along their hypotenuses, as shown in FIG. 5. A photon striking point C on the anode influence, in the semi-cathodes 20, 22, the grey zones 24, 26, whose areas depend of course on the position of C with respect to the ends of the anode. Signals $S_1$ and $S_2$ collected at the semi-cathodes have the trends shown in FIGS. 6 and 7. It can be seen that they have the same shape but different amplitudes. This variation of amplitude depends on the area influenced. Thus, we have a means for localizing the point of impact C.

This counter is robust and has a very flat response curve as well as good linearity, but its counting rate is limited because of its principle. In fact, measuring the amplitude for an X photon may be spoiled by an error because of the presence of another X photon arriving a few instants sooner or later.

The object of the present invention is to remedy the above-mentioned drawbacks of counters of the cited prior art and proposes for this purpose a radiation localizing counter which is characterized in that it comprises essentially at least one anode wire surrounded by a resistive cathode of appropriate shape, the whole being plunged in a gas atmosphere which forms the radiation detecting element.

According to one advantageous embodiment of the invention, the cathode is formed by a coil of resistant metal wire through which passes axially the anode wire. Thus, the cathode wire and the capacity formed by the screening which surrounds it form a distributed constant sensor.

The wire is chosen with a very small diameter with respect to the pitch of the coil, so that it only absorbs a negligible part of the incident radiation.

With such an arrangement, all the signal which is developed by influence on the cathode is available for determining the localization, since the cathode sees the anode wire through the total solid angle. On the contrary, in the previously mentioned known detectors, which use the cathode as sensor, only a small fraction of the influence signal created in the vicinity of the anode wire, is available for determining the localization. This fraction corresponds to the solid angle through which the sensor sees the anode wire.

In a practical embodiment, the detector of the invention comprises two supports in the form of half cylinders, provided on their cylindrical wall with a thread whose pitch corresponds to the one desired for the coil, said supports being fixed by their ends to a mounting frame which holds them spaced apart and parallel, with their cylindrical wall turned outwardly, the cathode wire being wound around the thread of said supports and the anode wire being stretched inside the coil between two terminals carried by the frame.

The supports are made from a single cylindrical rod on which is formed a thread of a pitch equal to the one desired for the coil and which is cut in two along a diametrical plane. Thus, regular spacing apart of the turns of the coil is obtained.

According to another embodiment of the invention, the cathode is formed by a resistive tubular surface, inside which the anode wire passes axially.

According to another feature of the invention, the detector allows a linearity error of the response curve to be corrected or a desired response curve to be obtained. To obtain these results, according to a first process, the capacity spread out along the detector may be varied, for example by giving the screening a curved shape. According to a second process, a coil is formed with variable pitch. The resistance of the conducting layer of the cathode may also be varied, in the case where it is formed by a layer.

The principle of the invention may be used for constructing a bi-dimensional detector. In a particular embodiment such a detector comprises two coiled cathodes, disposed at 90° with respect to each other and fitting one into the other, a layer of anode wires being placed inside the inner coil. The signals corresponding to the two dimensions are collected at the terminals of the cathodes.

According to a second embodiment, the bi-dimensional detector comprises a coiled cathode in which is fitted perpendicularly an anode also coiled and with a flattened structure, brought to the positive potential of the high voltage. The photon is detected along one axis by the cathode and along the other axis by the anode.

A bi-dimensional detector may further be formed by using two elementary superimposed cathodes oriented perpendicularly with respect to each other, each of them receiving a layer of anode wires.

The invention will be better understood from reading the following description of several embodiments of the detector, given by way of non limiting examples with reference to the accompanying drawings in which:

FIG. 1 is a schematical representation of the BORKOWSKI and KOPP detector;

FIGS. 2 and 3 show the signals collected at the ends of the anode wire of this detector;

FIG. 4 is the diagram of the delay line detector of GABRIEL;

FIG. 5 shows schematically the clearance detector of JACQUET;

FIGS. 6 and 7 show the signals supplied by this detector;

FIG. 8 is a schematic view of the coil of the detector according to the invention:

FIG. 9 is a schematic end view of the detector;

FIG. 10 is a perspective view of the detecting cell of the invention;

FIG. 11 shows schematically a tubular cathode;

FIG. 12 shows schematically a cathode in the form of a tube portion;

FIG. 13 shows a flat cathode cell;

FIG. 26 shows the diagram of a detector with curved cathode screen;

FIG. 27 shows a coiled cathode with variable pitch;

FIG. 28 illustrates the application of a curved screen detector for correcting the parallax effect on a diffraction goniometer;

FIGS. 29 to 31 show perspective views of three detector arrangements for bi-dimensional detection of a radiation;

Figure 14:
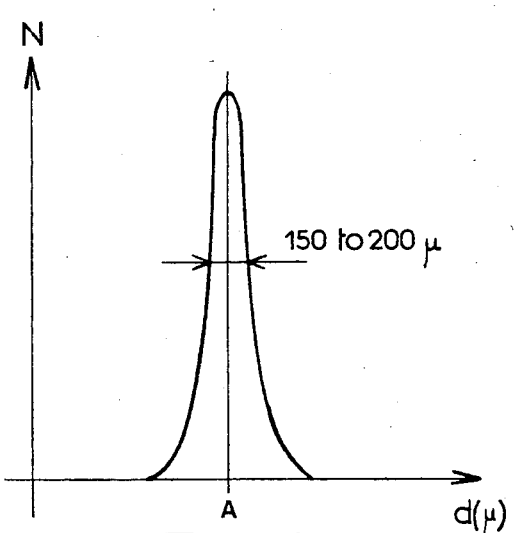
FIG. 14 shows a spatial resolution diagram obtained with a coiled cathode cell.

Since the known radiation localizing detectors have been described with reference to FIGS. 1 to 7, we will now pass directly to description of the detector of the invention.

The detector shown in FIG. 8 comprises fundamentally a cathode 30 formed by a resistant metal wire coil, through which passes axially an anode wire 32 which is connected to the positive terminal of a high voltage source. Several anode wires may also be disposed inside the coil. The assembly of cathode and anode is contained in an enclosure 34 (FIG. 9) filled with a gas atmosphere 36 comprising 90% xenon or argon and 10% methane, in the case of X photon detection.

When a photon penetrates into the enclosure through a window 37 provided for this purpose, it loses energy through the Compton effect and tears away during its progress several primary electrons, each of these latter tearing away in its turn other electrons. A pulse then appears at cathode 30 by influence so that two signals $S_1$ and $S_2$ may be collected at its ends, whose shape or amplitude depend on the point of impact of the photon on the anode wire, as will be explained hereafter.

The detection cell shown in FIG. 10 comprises an elongate metal frame 38 finishing at its ends in I shaped portions 40, 42. On each side of the central legs of said portions are fixed two insulating supports 44,46 in the shape of half cylinders which present on their cylindrical wall a thread of small pitch. The supports are then parallel and spaced apart by a distance equal to the thickness of said central legs. In the gap between the supports is stretched longitudinally a metal anode wire 48 which is hooked at its ends on two terminals 50,52 carried respectively by two insulating structures 54,56 fixed to said endmost portions 40, 42 of the frame. One of the terminals is connected to the positive terminal of a high voltage source. The anode wire is stretched by means of spring blades 58.

A cathode wire 60 is wound on supports 44,46 by causing it to pass in the successive threads of the threaded portion. Thus a coil is obtained with very even closely wound turns.

The ends of the cathode wire are connected to terminals 62,64 at which are collected signals $S_1$ and $S_2$ induced by the anode wire 48 when a photon strikes it. Since the cathode wire 60 completely surrounds the anode wire 48, it picks up the whole of the influence signal induced by this latter. The result is that the signal/noise ratio of the pre-amplifiers, obtained during processing of signals $S_1$ and $S_2$ is considerably greater than that obtained with known detectors. The resolution is therefore also improved. Moreover, because of the low capacity of the coiled cathode, a high counting rate is obtained.

Similar performances are obtained with the cell of FIG. 11, which comprises a tubular cathode 66 in which is disposed an anode wire 68.

In the cases where medium resolution is sufficient, the cathode may be reduced to a tube portion 69 (FIG. 12) or even to a plate 70 (FIG. 13).

An example of construction of a cell of the type shown in FIG. 10 is given herebelow.
Effective length L: 50 mm
Thickness e of the active zone: 5 mm
Height of the window: 9 mm
Diameter of the anode wire: $20\mu$
Diameter of the cathode wire: $15\mu$
Pitch of the coil: $200\mu$
Resistance of the cathode: 85 Kohm
Capacity of the cathode: 60 pF
Filling gas: 90% argon and 10% methane The cathode is made from any material which is not likely to stretch during coiling, for example from a chromium and nickel alloy. The anode may be formed from molybdenum or tungsten possible gold coated.

FIG. 14 shows the special resolution obtained at any point A on the cell with a tubular cathode cell of the type shown in FIG. 10, the detector being placed in front of a slit $50\mu$ wide and 8 mm high. The position d of the point of impact on the anode wire is shown as abscissa and the number of impacts N recorded at the point considered is plotted as ordinates. The resolution thus obtained is between 150 and $250\mu$ depending on the value of the filling pressure of enclosure 36 (FIG. 9). This resolution remains practically uniform over a cell length of 45 mm.

Figure 15:
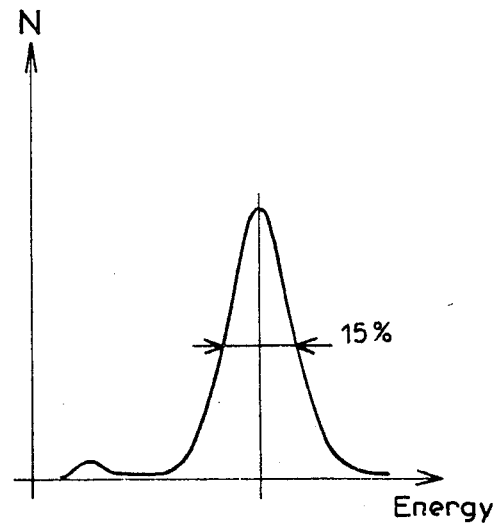
FIG. 15 shows an energy resolution diagram obtained with a tubular cathode cell.

FIG. 15 shows the energy resolution with a tubular cathode cell with a beam diffracted on a lithium fluoride crystal serving as monochromator. The resolution is 15% and this value is constant within 1% over a cell length of 45 mm. The maximum counting rate is between 30,000 and 50,000 strikes per second and the total electronic dead time is of the order of 10 microseconds.

Figure 16:
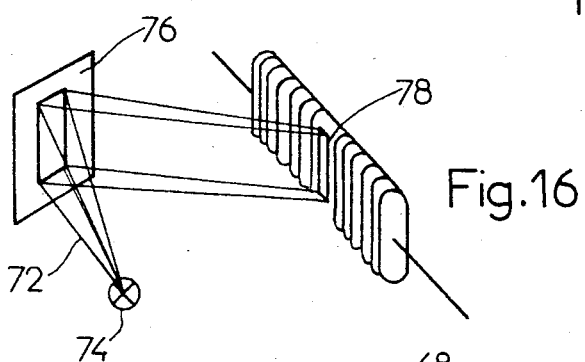
FIG. 16 shows schematically a practical circuit for detecting an X ray beam diffracted on a sample.

A great feature of this counter resides in the very small variation in the spatial resolution as a function of the height of the localized beam. Between 2 and 8 mm in height, the variation is less than 10%. This is due to the great symmetry of the counter and to the fact that the incident beam is parallel to the cathode wires, as shown in FIG. 16. A beam 72 emitted by X-ray tube 74 is diffracted by a sample 76. Reference 78 shows the shape of the diffracted beam.

This advantage is particularly interesting for it determines the conditions of the experiment, such as the duration of the measurement, the flow detected being maximum with a large slit height.

Figure 17:
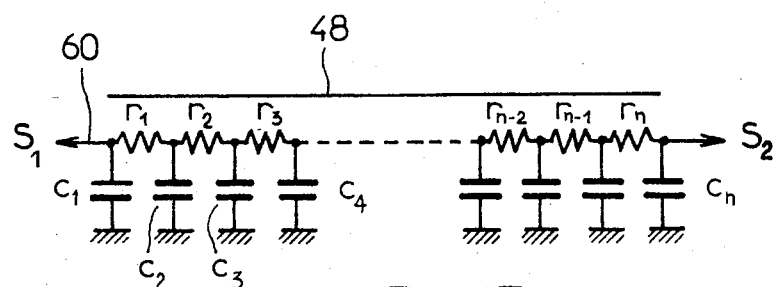
FIGS. 17 and 18 show the electrical circuits equivalent to the cell of the invention.

There will now be explained the method of determining the position of the X photon. First of all, it will be noted that the cell of FIG. 10 can be likened to a distributed constant line, such as shown in FIG. 17, in which $r_1$ and $r_n$ are the resistances of the turns of cathode 60 and $C_1$ and $C_n$ are the capacities of these turns with respect to the screen. Reference 48 shows the anode wire.

Figure 18:
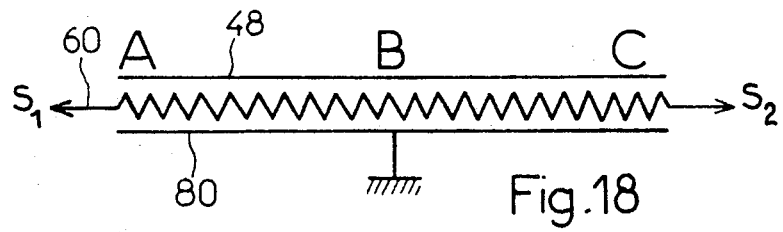

When the number of turns is very large, the sum of parallel capacities $C_1$ to $C_n$ tends towards infinity, so that they may be replaced by a line 80 connected to ground, as shown in FIG. 18.

Figure 19:
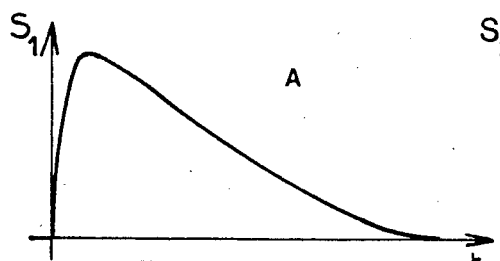
FIGS. 19 and 20 show the signals collected at the ends of the cathode wire when a photon strikes one of said ends.
Figure 20:
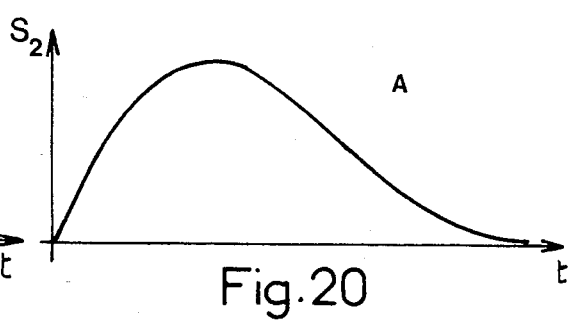
Figure 21:
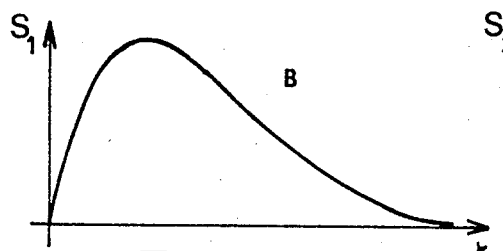
FIGS. 21 and 22 show the signals collected at the ends of the cathode wire when a photon strikes substantially the middle of the cathode.
Figure 22:
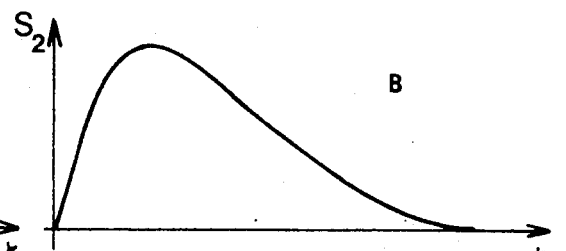

The shape of signals $S_1$ and $S_2$ collected at the ends of cathode 60 depends on the position of the impact of the X photon. Thus, if the photon arrives at A in FIG. 18, the signal $S_1$ will have a very short rise time, whereas signal $S_2$ which will have been integrated by the line between A and C will be very long in rising. The signals thus collected are shown respectively in FIGS. 19 and 20. In the case where the photon arrives at a point B situated substantially in the middle of the length of the cell, the signals $S_1$ and $S_2$ collected at the ends of the cathode are deformed in the same way and have the trend shown in FIGS. 21,22.

Finally, if the photon strikes C situated at the other end of the cell, the same signals as in the case where the impact was at A will be obtained but the signals $S_1$ and $S_2$ are exchanged.

Figure 23:
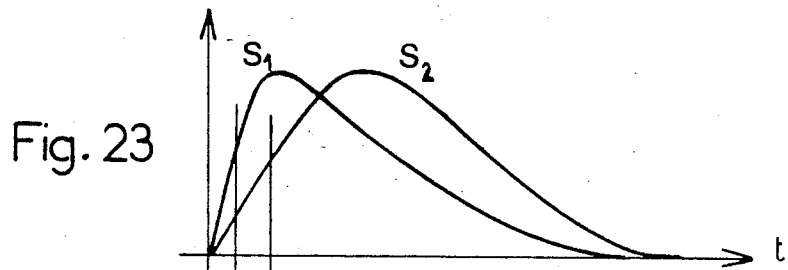
FIGS. 23 to 25 illustrate the process for determining the impact point of the photon on the cathode.
Figure 24:
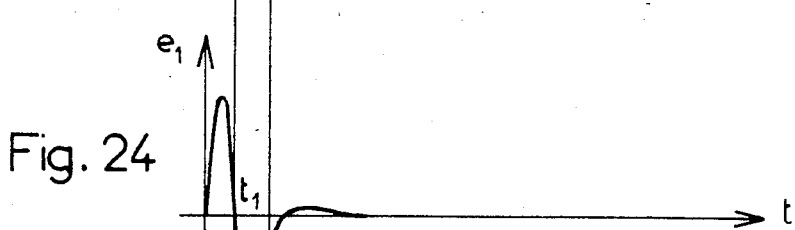
Figure 25:
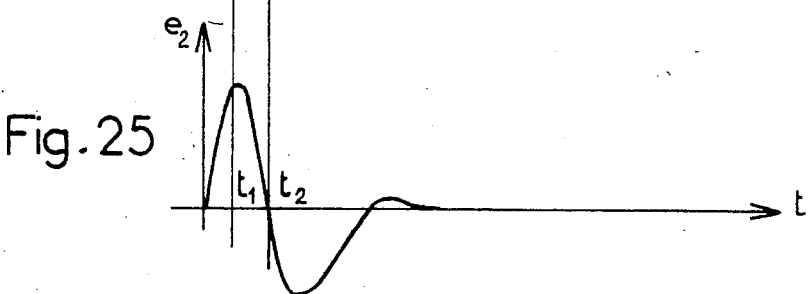

By means of a conventional processing system, shaping of signals $S_1$ and $S_2$ of FIG. 23 may be achieved by double differentiation, which allows signals $e_1$ and $e_2$ shown in FIGS. 24,25 to be obtained. The difference $t_2 - t_1$ between the zero crossing times of signals $e_2$ and $e_1$ represents the position data of the detected radiation.

FIG. 26 shows the equivalent electrical diagram of a detection cell in which the screening 80 has a suitably curved shape so as to cause the distributed capacity of the cell to vary, for correcting a linearity error of the response curve of the cell or for obtaining a desired response curve.

The response curve may also be corrected by using a coiled cathode with variable pitch 82, shown in FIG. 27, or else by varying the resistance of the conducting layer, when the detector is thus formed.

These correction processes may be used for correcting the parallax effect on a diffraction goniometer by giving to the detector a pseudo curvature radius, as shown in FIG. 28. A beam 84 of X-rays is diffracted by a sample 86 along a goniometric circle 88 tangent to the anode wire 90 of the detector. The screening 92 of this latter is given a curvature calculated so that the parallax 94 is corrected.

It goes without saying that the detector of the invention may also be used for detecting beta and neutron radiations, only the nature of the detecting gas being changed in both cases.

Three particular embodiments of the bi-dimensional detectors will now be described.

In the embodiment shown in FIG. 29, two coiled cathodes 96,98 are fitted one into the other, so that the planes of their turns are perpendicular. A layer of anode wires 100 is placed inside the internal cathode 98. The signals corresponding to the two dimensions are collected at terminals X, Y of the cathodes.

The bi-dimensional detector shown in FIG. 30 comprises a single coiled cathode 102 and an anode 104 also coiled but having a very flattened structure. The anode is inserted in the cathode so that its turns are perpendicular to those of the cathode. The anode is brought to the positive potential of the high voltage. The photon is detected along axis X by the cathode and along axis Y by the anode. As a variation, the anode may be replaced by a resistant metal wire bent in a zig-zag shape.

The bi-dimensional detector of FIG. 31 comprises two elementlary superimposed cells orientated so the turns of their respective cathode 106,108 are perpendicular to each other. In fact, since the detection of the photon takes place by Compton effect, that is to say by loss of energy along the path of the photon, this latter after passing through the first cell 106 has still enough energy to produce a signal in the second cell 108. The thickness of each cell may be adjusted so that the electric signal is equivalent in each cell. If the desired area is large, it will be necessary to dispose several anode wires in each cell so as to provide a sufficient electric field for the photons detected in the region of the edges.

There will now be described, with reference to FIGS. 32 and 33, the diagram of the electronic circuit of a device for processing the signals supplied by the detector of the invention.

Figure 32:
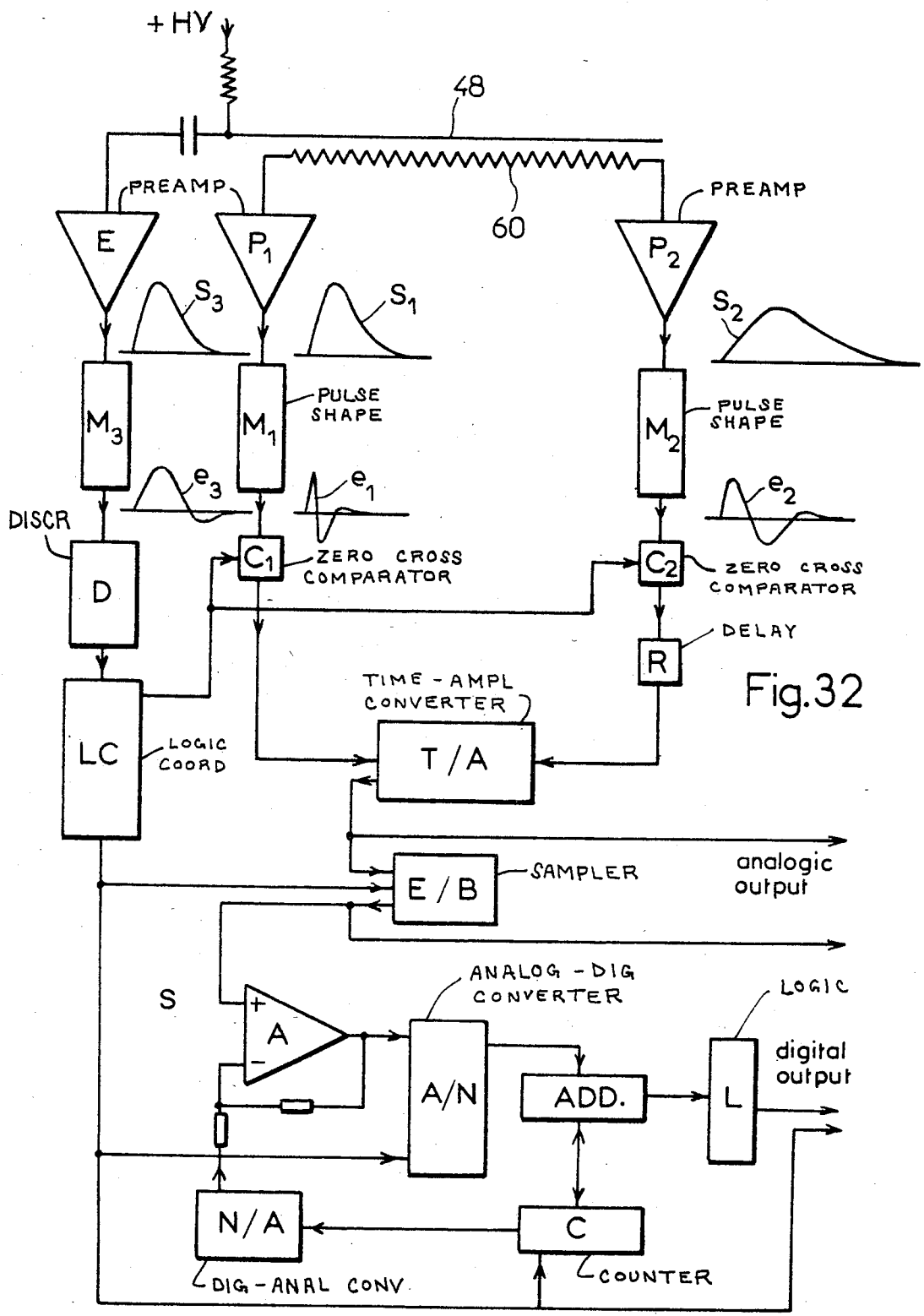
FIG. 32 is the block electronic diagram of the device for processing the signals supplied by the detector.

With reference to FIG. 32, the signal from the anode wire 48 is amplified by a pre-amplifier E, then shaped by the shaping device $M_3$ by double differentiation and integration of signal $S_3$ supplied by the pre-amplifier E. Thus, the signal $e_3$ is obtained. This then passes into the energy discrimination circuit D.

The signals from the ends of cathode 60 are amplified by pre-amplifiers $P_1$ and $P_2$ which supply the signals $S_1$ and $S_2$. These signals are shaped by double differentiation in devices $M_1$ and $M_2$. The zero crossing of signals $e_1$ and $e_2$ coming from $M_1$ and $M_2$ is detected by comparators $C_1$ and $C_2$. The signal from comparator $C_2$ is delayed by the circuit R.

The signal supplied by $C_1$ triggers a time-amplitude converter T/A whereas the signal from R stops said converter. Thus there is obtained at the output of this latter an amplitude representing the position of the X photon detected by the counter.

A sampler-disabler E/B allows the value contained in converter T/A to be removed so as to free this latter. An analog-digital converter A/N converts the value contained in the sampler-disabler into a digital value which also represents the position of the photon X in the counter.

Figure 34:
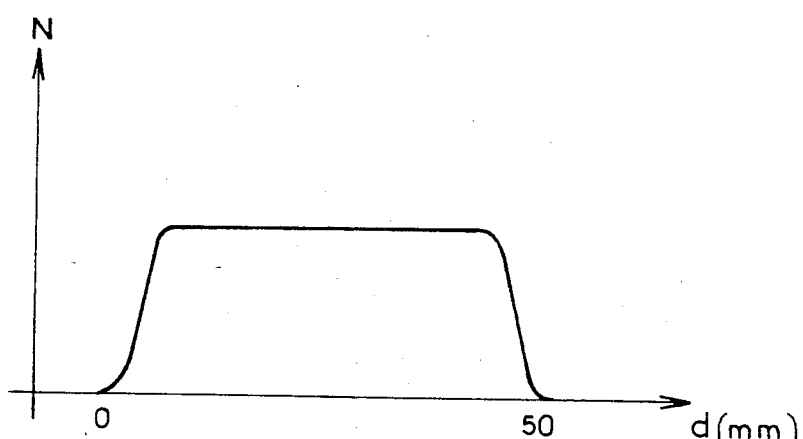
FIG. 34 shows the response curve of the counter of the invention.

The signal coming from the discrimination circuit D is received by coordination logic LC whose output is connected to the sampler-disabler E/B and to the analog-digital converter A/N. Said logic allows the whole to be synchronized, and in particular it norms the dead time of the system to a fixed value (from the appearance of the anode pulse to transfer from the time-amplitude converter T/A to the sampler-disabler E/B). This results in obtaining, over the whole length of the cell, an equal processing probability density, for each event processed, and consequently a rectilinear response curve. The response curve of the counter has the trend shown in FIG. 34, in which the length of the cell is plotted as abscissa and the number of strikes N per second as ordinates.

Figure 33:
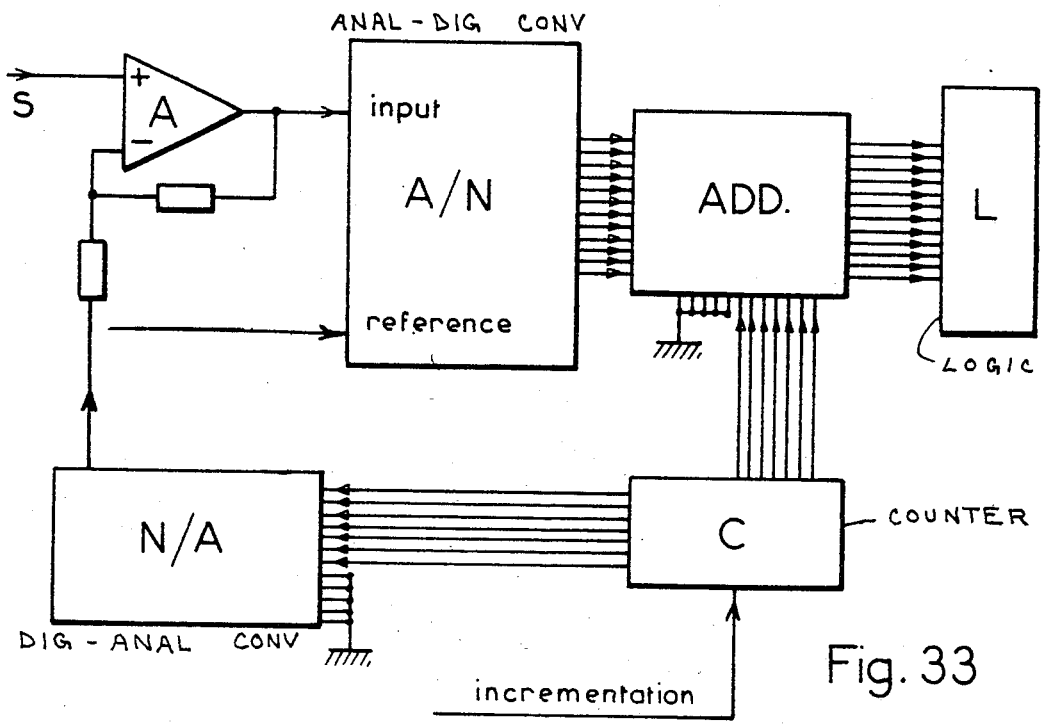
FIG. 33 is a circuit for correcting the defects of the analog-digital converter of FIG. 32.

FIG. 33 explains in more detail the lower part of the diagram of FIG. 32. The analog-digital converter A/N with successive approximations, though it allows great rapidity, presents on the other hand a serious drawback in so far as the quality of the curve obtained is concerned. This is due to the inequality of the steps of the converter. In an analog-digital converter with 4096 steps (12 bits), these defects appear prcincipally at the overlapping points of the following steps: (2047,2048), (1023,1024), (511, 512), (255,256), (127,128), etc....

The diagram shown in the lower part of FIG. 32 and in more detail in FIG. 33 remedies this disadvantage, so that it becomes possible to conciliate the rapidity of the successive approximation converters and the high quality of the statistical distribution of the points of the curve. It will be noted that this circuit is only valid for statistical cumulation. In this diagram, binary counter C connected to the coordination logic LC is incremented after each event. This counter is connected to a digital-analog converter N/A, so that it may translate the value which it contains into a voltage proportional to this value.

Counter C is also connected to a binary adder ADD for adding the value which it contains to that given by the analog-digital converter A/N which it is a question of correcting. The output voltage of the digital-analog converter N/A is subtracted by a differential amplifier A from the signal to be measured S; the result is that the analog value subtracted at the input from the signal to be measured S is added in binary form at the output of the analog-digital converter A/N by the adder ADD. The gain of the differential amplifier A should be adjusted so that the subtracted value is equal to the value added at the output by the adder.

With such a system, for the same signal amplitude to be measured, different measuring points of the analog-digital converter A/N may be used and, consequently, the histogram obtained will only be spoiled by errors from said converter in the ratio e/N, e being the maximum differential error before correction and N the number of points covered by the counter on the scale of the analog-digital converter.

If we assume N=128 (7 bit counter) and e=0.5 of the least significant bit, we will have e/N=1/256 of the least significant bit, which represents an error situated within that due to statistical cumulation, itself equal to $\sqrt{N}$, which is the aim to be achieved.

It goes without saying that modifications of detail may be made to the embodiments described without for all that departing from the scope and spirit of the invention. For example, instead of obtaining localization by measuring the phase of signals $S_1$, $S_2$ this result may be achieved simply by dividing the charge between the two ends of the cathode according to the formula $p = s_1/(s_1 + s_2)$, $s_1$ and $s_2$ being the peak values of signals $S_1$ and $S_2$ and p characterizing the position of the impact point.

I claim:

1. An electromagnetic radiation localizing detector of the type comprising at least one anode wire and a cathode of appropriate shape, both disposed in a gas atmosphere which forms the radiation detecting element, characterized in that the cathode is formed of electrical resistance wire bent in a sequence of turns extending transversely of the anode wire thereby forming a coil which surrounds at least partially the anode wire, the detector including a screen having distributed capacitance with the turns of the cathode resistance wire, the distributed resistance and capacitance of the cathode introducing a change in the rise time of the waveform of a radiation signal received thereby dependent on the distance between the locus of reception of such signal and a terminal of the cathode.

2. The detector according to claim 1, characterized in that the cathode coil is formed by a metal resistant wire (60), through which passes axially the anode wire (48).

3. The detector according to claim 2, characterized in that the wires have a small diameter with respect to the pitch of the cathode coil.

4. The detector according to claim 1, characterized in that it comprises two insulating supports (44,46) in the shape of half cylinders, having on their cylindrical wall a thread of a pitch correspond to that of the cathode coil; said supports being fixed by their ends to an assembly frame (40) which holds them spaced apart and parallel, with their cylindrical wall turned outwardly, the cathode coil wire (60) being coiled around the threading of said supports and the anode wire being stretched inside the cathode coil, between two terminals carried by the frame.

5. The detector according to one of the preceding claims, characterized in that the capacity along the detector is distributed in accordance with a predetermined function, which corrects the response curve of the detector or provides a desired detector response curve.

6. The detector according to claim 5, characterized in that the cathode coil has a variable pitch.

7. The detector according to claim 5, characterized in that the cathode wire has a variable resistance.

8. The detector according to claim 5, characterized in that the screen is curved.

9. The detector according to any one of claims 1 to 4, for bi-dimensional detection of electromagnetic radiation, characterized in that the detector comprises two coiled cathodes (96,98) disposed at 90° with respect to each other and fitted one into the other, a layer of anode wires (100) being placed inside the inner coil, and terminal means for collecting the signals corresponding to the detected radiation.

10. The detector according to one of claims 1 to 4, for bi-dimensional of electromagnetic radiation detection, characterized in that the detector comprises a coiled cathode (102) in which is fitted perpendicularly an anode (104) also coiled in a flattened structure and brought to a positive potential of high voltage, radiation being detected along one axis by the cathode and along the other axis by the anode.

11. The detector according to one of claims 1 to 4, for dimensional detection of electromagnetic radiation, characterized in that it comprises two elementary superimposed cathodes (106,108) oriented perpendicularly with respect to each other, each of them receiving a layer of anode wires.

12. The detector of any one of claims 1 and 4 including circuit arrangement means, said circuit arrangement means comprising two circuits for processing the signals collected at the ends of the cathode wire, each of said circuits comprising in series a pre-amplifier ($P_1$, $P_2$), a shaping circuit ($M_1$, $M_2$), and a comparator ($C_1$, $C_2$) for detecting the zero crossing of the signal ($e_1$, $e_2$) coming from the shaping circuit; the signal $e_1$ from one of the comparators causing triggering of a time-amplitude converter (T/A) and the signal $e_2$ from the other comparator being delayed by a delay circuit (R) which supplies a signal which disables said converter, the output of the delay circuit being connected to a sampler-disabler (E/B) which supplies an analog signal which is transformed into a digital signal by an analog-digital converter (A/N); said circuit arrangement means further comprising a circuit for processing the signal supplied by the anode wire, said circuit comprising in series a pre-amplifier (E), a shaping circuit ($M_3$) for effecting the double differentiation of the signal from the pre-amplifier, an energy discrimination circuit (D) and co-ordination logic circuit (LC) whose output is connected to the sampler-disabler (E/B) and to the analog-digital converter (A/N).

13. The detector of claim 12 wherein the circuit arrangement means further comprises a binary counter (C) the count of which is incremented at each photon impact; said counter being connected to said analog-digital converter (A/N) through a loop comprising in series a digital-analog converter (N/A) and a differential amplifier (A), and further being connected to a binary adder (ADD); the gain of the differential amplifier being adjusted so that the value which it subtracts from the signal to be measured (S) coming from the sampler-disabler (E/B) is equal to the value added by the adder (ADD).

* * * * *